C. H. MELVIN.
CULTIVATOR.
APPLICATION FILED MAY 10, 1909.
1,096,852.
Patented May 19, 1914.
2 SHEETS—SHEET 1.
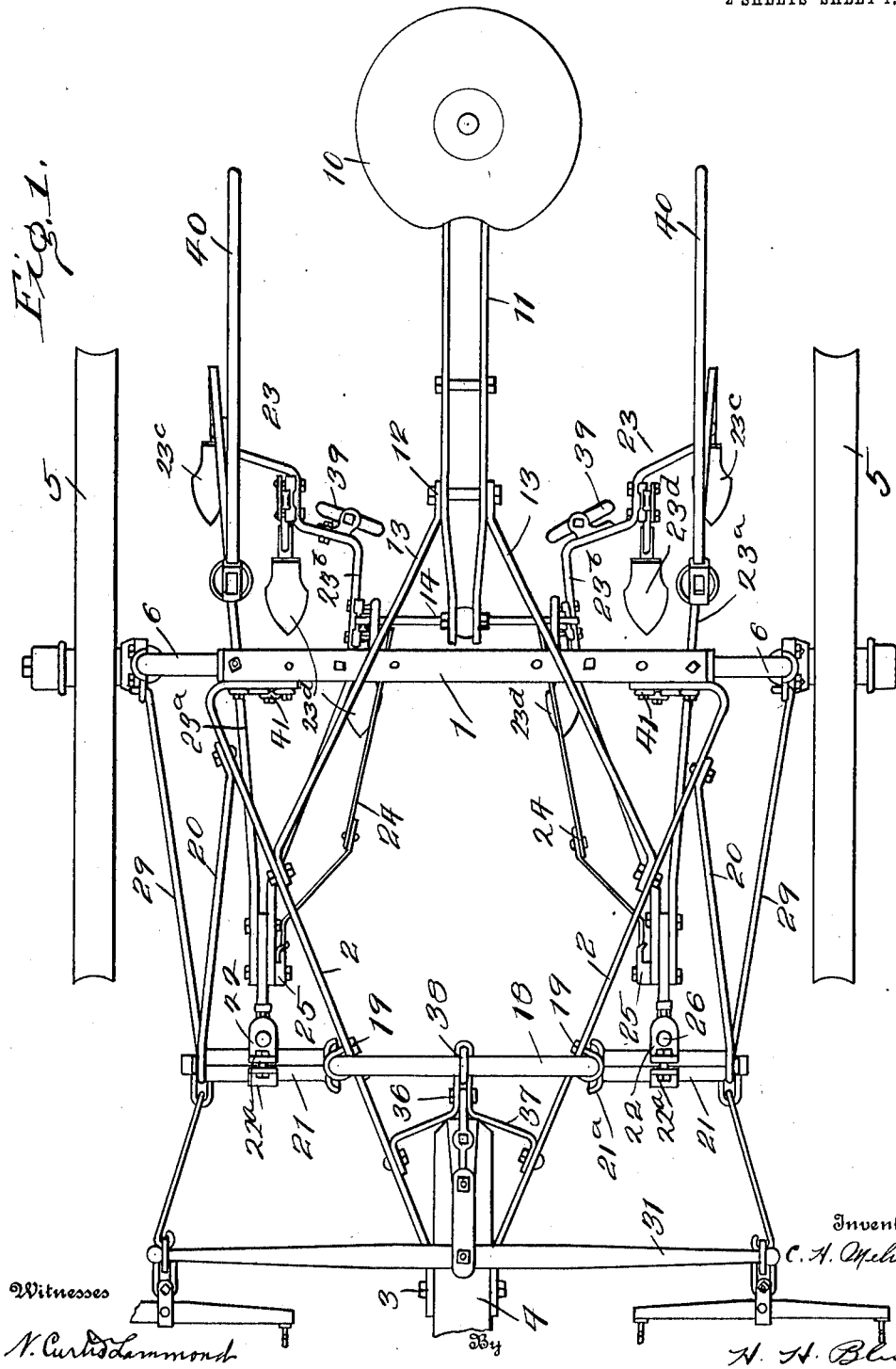

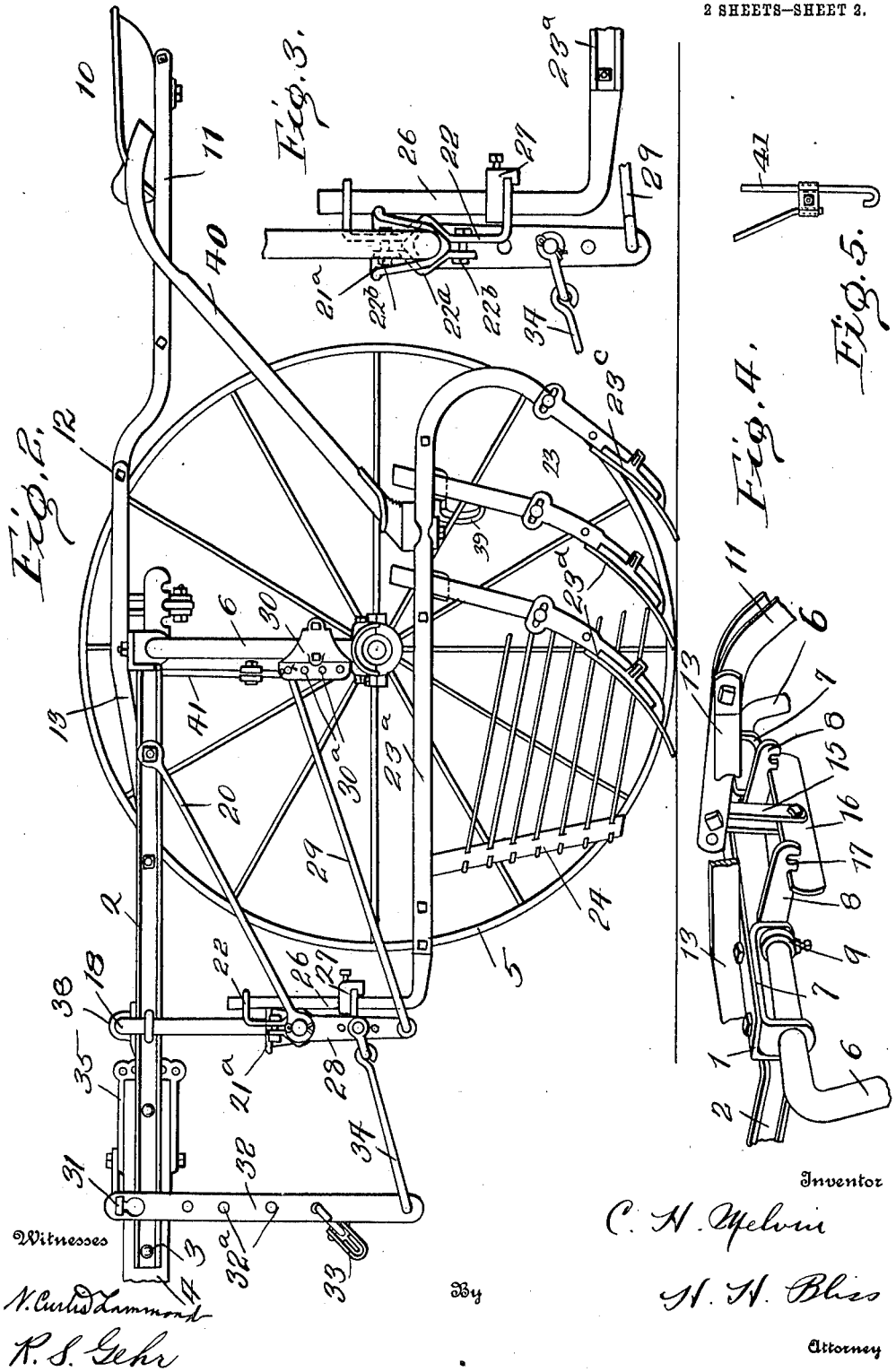

UNITED STATES PATENT OFFICE.

CHARLES H. MELVIN, OF MOLINE, ILLINOIS, ASSIGNOR TO DEERE & COMPANY, A CORPORATION OF ILLINOIS.

CULTIVATOR.

1,096,852.      Specification of Letters Patent.      Patented May 19, 1914.

Application filed May 10, 1909. Serial No. 494,976.

*To all whom it may concern:*

Be it known that I, CHARLES H. MELVIN, a citizen of the United States, residing at Moline, in the county of Rock Island and State of Illinois, have invented certain new and useful Improvements in Cultivators, of which the following is a specification, reference being had therein to the accompanying drawing.

This invention relates to riding cultivators in which the tool gangs are controlled without the use of manually operated levers, springs, or similar devices.

One of the objects of the invention is to provide an implement of this character in which the tools are suitably counterbalanced by the weight of the rider.

Another object is to secure a proper balancing of the entire implement both when it is in operation and when the draft of the team is removed.

A further object is to so construct and arrange the frame work of the implement that the rider will have an open and unobstructed view of the work.

Certain other objects, more specific in their character and, to a certain extent, incidental to the above, will be set forth in the course of the following description in connection with the accompanying drawings which show a preferred form of my invention.

Figure 1 is a plan view of a cultivator embodying my invention, Fig. 2 is a side elevation of the same, the near wheel being removed so as to better show certain features of the construction. Fig. 3 is a detail inside elevation of one of the rig connections, and Fig. 4 is a detail perspective view showing the adjustable balanced connection between the seat and the wheel axles. Fig. 5 is a detail view of one of the hooks for supporting the tool beams in inoperative position.

The draft frame of the implement as shown comprises a transverse angle bar 1, and bars 2, 2, having their inturned rear ends bolted to the transverse angle bar 1 and extending diagonally forward. At their forward ends these bars 2 are secured by means of a pivot bolt 3 to the tongue 4.

The ground wheels 5, 5 are mounted upon cranked axles 6, 6, each of which has its upper horizontal part rotatably mounted in a bracket 7 which is securely bolted to the transverse frame bar 1 in the manner shown in Fig. 4. Each of the axles carries at its upper inner end a rearwardly extending lever arm 8. This lever arm lies adjacent the inner end of bracket 7 and in connection with an adjustable locking ring 9 serves to hold the axle against transverse movement in the supporting bracket 7.

The seat 10 is carried by bars 11 which are pivoted at 12 on the rear ends of bars 13, 13, which rest upon the transverse bar 1 of the frame and have their front ends rigidly bolted to the frame bars 2, 2. The seat bars 11 are united at their forward end by a bolt 14 from which depends a link 15 preferably in the form of a strap or bar bent upon itself.

16 is a bar pivoted at its center to the lower end of the link 15 and having its ends in engagement with the respective lever arms 8, 8 of the wheel axles. The lower edges of the lever arms 8, 8 are notched at 17 to receive the upper edge of the bar 16 so that the parts are properly maintained in engagement. Each of the lever arms is preferably provided with a series of such notches so as to vary the effective length of the lever arm.

18 is an arch bar disposed across the forward part of the bars 2 and rigidly secured to them by means of U bolts 19, 19, and the lower out-turned ends of this arch bar are braced by diagonal rods 20, 20, which extend upward and rearward to the frame bars 2, 2, to which they are securely bolted. The arch bar thus constitutes a part of the rigid draft frame. On each of the out-turned horizontally disposed ends of the arch bar 18 is mounted a sleeve 21, and each of these sleeves, which are preferably casings, is formed at its inner end with an upstanding flared extension 21ª which partially embraces the adjacent vertical part of the arch bar and thus serves as a stop to limit the turning of the sleeve in either direction upon the said bar. An upstanding bearing bracket 22 is rigidly secured to each of the sleeves 21 by means of a clamping bar 22ª and bolts 22ᵇ, the sleeve preferably being angular in cross section exteriorly, as is clearly shown, to facilitate the rigid holding of the bearing bracket which is bent to conform to the exterior of the sleeve.

The bearing brackets 22 are designed to receive the front ends of the tool gangs which are designated as entireties as 23, 23, and which may be of any preferred construction suitable to an implement of this character. As shown, each gang comprises an outside bar 23ª and an inside bar 23ᵇ bolted at its front and rear ends to the bar 23ª. The bar 23ª carries at its rear end a shovel or other tool 23ᶜ, and similar tools 23ᵈ are carried by the bar 23ᵇ. The gangs are also provided, as shown, with guards or fenders 24, 24, which are secured by clamps 25, 25 to the front end of the gang frames. To the front of each of the gangs is bolted the upturned spindle 26, which is swiveled in the rearwardly turned ends of the bracket 22. A locking collar 27 adjustably mounted on the spindle 26 and formed to movably engage the rounded end of the bracket 22, serves to hold the spindle 26 against longitudinal movement in the bearing bracket. The gangs thus constructed and mounted are clearly free to swing laterally in the bearing brackets 22, and may also be raised and lowered to the extent permitted by the limited movement of the sleeves 21 upon the arch bar 18.

Each of the sleeves 21 is formed with a depending arm 28, and the lower end of each of these arms is connected by means of a link 29 with a bracket 30 carried by the wheel axle on the same side of the machine. This bracket 30 is provided with a series of holes 30ª to receive the end of the link 29 so that said end may be adjusted up or down, toward or away from the bearing bracket 7 in which the axle turns.

A doubletree 31, which is mounted on the top of the tongue 4, carries at each end a depending bar 32 provided with a series of holes 32ª in one of which is fastened a swingletree 33. The lower end of each of these bars 32 is connected by means of a link 34 with the adjacent lever arm 28, the latter being provided with a series of holes so that the connection of the link 34 with the lever arm can be adjusted lengthwise of said arm.

The tongue 4, which is pivoted to the draft frame by means of the bolt 3, is rigidly secured in any desired position of vertical adjustment by means of the clip or bracket 35 in coöperation with a bolt 36 which, as shown, is carried by a bar 37 rigidly secured at its ends to the side bars 2 of the frame, and also secured by a U bolt 38 to the arch bar 18.

Each of the tool gangs carries a stirrup 39, also a handle bar 40 which extends upward in position to be conveniently grasped by the rider.

41, 41 are depending links secured at their upper end to the transverse bar 1, and formed at their lower ends with hooks which are adapted to receive and hold the tool gangs in elevated inoperative position.

In operation, the action of the parts is as follows: The weight of the rider is transmitted through the seat bars 11, link 15, bar 16, and lever arms 8 to the wheel axles 6, tending to swing the latter and the wheels backward. The axles in turn, by reason of the links 29, tend to draw the depending lever arms 28 backward so that a force is exerted on each of the sleeves 21 tending to turn it on the supporting arch bar 18 and thus to swing the tool gang upward about said bar as a center. It is clear, therefore, that the weight of the rider is applied and transmitted in such a manner as to counterbalance the weight of the tools. This counterbalancing action, however, is modified by the draft of the team, which is applied to the depending bars 32. From these bars the draft is transmitted in part through the doubletree to the tongue, but largely through the links 34 to the depending lever arms 28 thus tending to turn the sleeves 21 in a direction to swing the tool gangs downward. It is clear, therefore, that the weight of the rider and also the backward drag of the wheels on the axles tend to elevate the tool gangs while the draft of the team, acting opposingly, tends to swing said gangs downward. By proper adjustment of the links 29 in the brackets 30 and of the link 31 on the lever arms 28, the leverage of the two opposing forces, or sets of forces, may be varied so as to bring about suitable resultant forces on the sleeves 21 to produce the desired counterbalancing effect on the tool gangs. The machine may be quickly adapted to riders of different weights by simply adjusting the beam 16 inward or outward on the lever arms 8. The tools being counterbalanced in the manner described, are easily shifted laterally to follow the row of plants, this being done either by the feet of the rider in the stirrups or by means of the gang handles. The rider can also easily vary the depth of penetration of the tools by pressing the latter downward with his feet. As to the balance of the frame work of the implement as an entirety upon the wheels, it will be observed that the draft of the team is applied to the draft frame in such a manner that the resultant line of the draft lies above the wheel axles and, therefore, acts in a direction to swing the tongue downward. This latter tendency, however, is counteracted by the weight of the rider. When the draft of the team is removed, there is a natural tendency for the tongue to swing upward under the weight of the rider, but this is prevented because the weight of the rider, being now unopposed by the draft of the team, causes the wheel axles 6 to swing backward and the tool gangs to be elevated somewhat. The change in the position of the wheels, together with the added weight thrown on the arch bar by reason of the elevation of the tool gangs, maintains the balance of the frame as a whole.

It will be observed that the connections between the seat bars and the tool gangs are such that the central part of the frame is left entirely open and unobstructed so that the rider may have a clear, unobstructed view of the work.

By reason of the stops 21ª, carried by the sleeves 21, the various parts are limited to a definite range of movement within which the counterbalancing actions heretofore set forth should take place. If the leverage adjustments on the lever arms 28, the brackets 30 and the lever arms 8 are not as they should be to give the desired result, this fact is at once indicated by the stops 21ª being held in contact with the arch bar 18. The stops 21ª thus serve as indicators by which the rider may know when the implement is in proper adjustment. The stops, of course, perform the further function of preventing the movement of the parts out of operative position.

What I claim is:

1. In an implement of the character set forth, the combination of a draft frame, draft devices movable independently of the frame under the action of the draft, cranked axles mounted to turn in the draft frame, wheels on said axles, rising and falling tool gangs connected to the draft frame, a seat pivotally supported on the draft frame, operative connections between the seat and axles whereby the weight of the rider tends to swing the axles, connections between the axles and tool gangs whereby movement of the axles by the weight of the rider tends to elevate the gangs, said connections being movable with the draft devices independently of the main frame, substantially as set forth.

2. In an implement of the character set forth, the combination of two ground wheels, a draft frame supported entirely on said two wheels, cranked axles mounted to turn in the draft frame and carrying said wheels, tool gangs pivoted on a transverse axis to the draft frame, a seat pivotally supported on the draft frame, operative connections between the seat and axles whereby the weight of the rider tends to swing the axles and vertically vibrate the draft frame, and connections between the axles and tool gangs whereby movement of the axles by the weight of the rider tends to elevate the gangs, substantially as set forth.

3. In an implement of the character set forth, the combination of a draft frame, draft devices movable longitudinally of the frame, cranked axles mounted to turn independently of each other in the draft frame, wheels on said axles, rising and falling tool gangs connected to the draft frame, a seat pivotally supported on the draft frame, equalizing connections between the seat and axles whereby the weight of the rider tends to swing the axles, connections between each axle and one of the tool gangs whereby movement of the axles by the weight of the rider tends to elevate the gangs, and means uniting said connections with the draft devices whereby the draft normally acts to tend to lower the gangs, substantially as set forth.

4. In an implement of the character set forth, the combination of a draft frame, cranked axles mounted to turn in the draft frame, wheels on said axles, rising and falling tool gangs connected to the draft frame, a seat pivotally supported on the draft frame, operative connections between the seat and axles whereby the weight of the rider tends to swing the axles, said connections being adjustable to vary the mechanical advantage with which the weight of the rider acts on the axles, and connections between the axles and tool gangs whereby movement of the axles by the weight of the rider tends to elevate the gangs, substantially as set forth.

5. In an implement of the character set forth, the combination of a draft frame, cranked axles mounted to turn in the draft frame, wheels on said axles, rising and falling tool gangs connected to the draft frame, a seat pivotally supported on the draft frame, operative connections between the seat and axles whereby the weight of the rider tends to swing the axles, and connections between the axles and tool gangs whereby movement of the axles by the weight of the rider tends to elevate the gangs, the last named connections being adjustable to vary the mechanical advantage with which the weight of the rider is transmitted to the tool gangs, substantially as set forth.

6. In an implement of the character set forth, the combination of a draft frame, cranked axles mounted to turn in the draft frame, wheels on said axles, rising and falling tool gangs connected to the draft frame, a seat pivotally supported on the draft frame, operative connections between the seat and axles whereby the weight of the rider tends to swing the axles, connections between the axles and tool gangs whereby movement of the axles by the weight of the rider tends to elevate the gangs, and means for limiting the movement of the aforesaid connecting devices between the seat and tool gangs, substantially as set forth.

7. In an implement of the character set forth, the combination of a draft frame, cranked axles mounted to turn in the draft frame, wheels on said axles, rising and falling tool gangs connected to the draft frame, a seat pivotally supported on the draft frame, operative connections between the seat and the tool gangs whereby the weight of the rider tends to elevate the gangs, and draft devices connected to the said operative connections through which the draft of the team is applied to said connections in opposition to the weight of the rider, substantially as set forth.

8. In an implement of the character set forth, the combination of a draft frame, cranked axles mounted to turn in the draft frame, wheels on said axles, rising and falling tool gangs connected to the draft frame, a seat pivotally supported on the draft frame, operative connections between the seat and axles whereby the weight of the rider tends to swing the axles, connections between the axles and tool gangs whereby movement of the axles by the weight of the rider tends to elevate the gangs, and draft devices connected with the axles through which the draft of the team acts upon the axles in opposition to the weight of the rider, substantially as set forth.

9. In an implement of the character set forth, the combination of a draft frame, cranked axles mounted to turn in the draft frame, wheels on said axles, rising and falling tool gangs connected to the draft frame, a seat pivotally supported on the draft frame, operative connections between the seat and axles whereby the weight of the rider tends to swing the axles, connections between the axles and tool gangs whereby movement of the axles by the weight of the rider tends to elevate the gangs, draft devices connected with the axles through which the draft of the team acts upon the axles in opposition to the weight of the rider, and means for limiting the movement of the aforesaid connecting devices between the seat and tool gangs and of the said draft devices, substantially as set forth.

10. In an implement of the character set forth, the combination of a main frame, wheels supporting the frame, tool beams adjustably connected to the main frame, a seat movably mounted on the main frame, means for communicating movement of the seat to the tool beams to move them vertically, draft devices, and means for transmitting movement of the draft devices to the tool beams to move the latter vertically, substantially as set forth.

11. In an implement of the character set forth, the combination of a main frame, wheels supporting the frame, tool beams adjustably connected to the main frame, a seat movably mounted on the main frame, means for communicating movement of the seat to the tool beams to move them vertically, draft devices, and means for transmitting movement from the draft devices to the beams to move them vertically in a direction opposite that in which they are moved by the seat.

12. In an implement of the character set forth, the combination of a main frame, wheels supporting the frame, tool beams adjustably connected to the main frame, a seat movably mounted on the main frame, means for communicating movement of the seat to the tool beams to move them vertically upward, draft devices, and means for transmitting movement of the draft devices to the tool beams to move the latter vertically, substantially as set forth.

13. In an implement of the character set forth, the combination of a main frame, wheels supporting the frame, tool beams adjustably connected to the main frame, a seat movably mounted on the main frame, means for communicating movement of the seat to the tool beams to move them vertically upward, draft devices, and means for transmitting movement of the draft devices to the tool beams to move them vertically downward.

14. In an implement of the character set forth, the combination of a main frame, two supporting wheels independently connected to the main frame and capable of a bodily movement in the direction of the line of draft, two shovel-supporting beams independently connected to the main frame and capable of independent vertical movement, means for raising and lowering the beams independently, means for raising and lowering the beams together, and connections whereby each wheel is moved bodily in correspondence with one of the beams.

15. In an implement of the character set forth, the combination of a main frame, two supporting wheels independently connected to the main frame and capable of a bodily movement in the direction of the line of draft, two shovel-supporting beams independently connected to the main frame and capable of independent vertical movement, means for moving the supporting wheel and beam at one side of the main frame in unison and independently of the supporting wheel and beam of the other side of the main frame, and also adapted to simultaneously move both wheels and beams in similar directions.

16. In an implement of the character set forth, the combination of a main frame, two stub axles pivotally connected to the main frame, a suppporting wheel for each axle, two shovel-supporting beams independently connected to the main frame and capable of independent vertical movement, means for moving the stub-axle and beam at one side of the main frame in unison independently of the stub-axle and beam of the other side of the main frame, and also adapted to move both stub-axles and both beams in unison in the same direction.

17. In an implement of the character set forth, the combination of a main frame, two supporting wheels independently connected to the main frame and capable of bodily movement in the direction of the line of draft, two shovel supporting beams independently connected to the main frame and capable of independent vertical movement, means for varying the working depth of the shovels of one beam independently of the working depth of the shovels of the other beam, connections between a beam and supporting wheel whereby they move in unison, and connections between both wheels whereby they and both beams may be moved in unison, substantially as set forth.

18. In an implement of the character set forth, the combination of a main frame, an arch bar, a sleeve having a pivotal connection with the arch bar and provided with a laterally extending arm, a movable axle, a wheel connected to the axle, a connection between the arm and axle, a shovel supporting beam movable with the sleeve, a draft connection with the arm, a seat, and power transmitting devices between the seat and the axle whereby the weight of the driver opposes the action of the draft connection, substantially as set forth.

19. In an implement of the character set forth, the combination of a main frame, two supporting wheels independently connected to the main frame and capable of a movement in the direction of the line of draft, an arch bar fixedly connected to the main frame, two shovel supporting beams independently connected to the arch bar and capable of independent vertical movement, means for moving the supporting wheel and beam of one side of the main frame in unison independently of the supporting wheel and beam of the other side of the main frame, and means for moving both wheels and both beams in unison and simultaneously, substantially as set forth.

20. In an implement of the character set forth, the combination of a main frame, two supporting wheels independently connected to the main frame and capable of a bodily movement in the direction of the line of draft, two shovel supporting beams independently connected with the main frame and capable of independent vertical movement, and a lever and lever connections with said beams and wheels for moving them in unison, said lever and lever connections being adapted to permit a supporting beam and wheel on one side of the main frame to move independently of the supporting beam and wheel on the other side thereof, substantially as set forth.

21. In an implement of the character set forth, the combination of a main frame, two supporting wheels independently connected to the main frame and capable of bodily movement in the direction of the line of draft, two shovel supporting beams independently connected with the main frame and capable of independent vertical movement, two levers, connections whereby a lever will move a supporting wheel and beam of one side of the main frame independently of the supporting wheel and beam of the other side of the main frame, and a lever adapted to coöperate with both the last said levers to move both supporting wheels and supporting beams in unison, substantially as set forth.

22. In an implement of the character set forth, the combination of a main frame, two supporting wheels independently connected to the main frame and capable of bodily movement in the direction of line of draft, two shovel supporting beams independently connected to the main frame and capable of independent vertical movement, two levers, connections whereby a lever will move a supporting wheel and beam of one side of the main frame in unison independently of the lever, supporting wheel and beam of the said main frame, a driver's seat, a lever connected to the seat and adapted to engage with both of the last said levers to move both wheels and both beams in unison under the action of the driver's weight, substantially as set forth.

23. In an implement of the character set forth, the combination of a main frame, two supporting wheels upon which the frame is mounted movable forward and back relative to the frame, two tool beams movably connected to the main frame, one of said beams being connected to and movable with each of the supporting wheels, and means for moving the wheels simultaneously, said means being adapted to permit either wheel to move bodily relative to the other wheel, substantially as set forth.

24. In an implement of the character set forth, the combination of a main frame, two wheels and wheel carriers movable longitudinally of the frame, two tool beams movably connected to the main frame, one of said beams being connected to and movable with each of the wheel carriers, and a common mechanism for moving the said wheels and wheel carriers adapted to move either wheel and its carrier independently of the other, substantially as set forth.

25. In an implement of the character set forth, the combination of a main frame, two supporting wheels therefor, two wheel carriers movable longitudinally of the frame, two tool beams each connected to a wheel carrier, two tool beams movably connected to the main frame, one of said beams being connected to and movable with each of the wheel carriers, and a common mechanism for moving both beams and their connected wheel carriers and adapted to move either beam and its connected carrier independently of the other beam and carrier, substantially as set forth.

26. In an implement of the character set forth, the combination of a main frame, two supporting wheels therefor, two wheel carriers movable longitudinally of the frame independently of each other, and means interposed between the two wheel carriers whereby each acts to resist the independent movement of the other, substantially as set forth.

27. In an implement of the character set forth, the combination of a frame, wheel carriers movable longitudinally of the frame, wheels on said carriers, draft devices tending constantly to draw the wheel carriers in one direction, and a driver's seat movable relative to the frame under the action of the driver's weight, said seat being connected to the wheel carriers and tending to move them in the opposite direction, substantially as set forth.

28. In an implement of the character set forth, the combination of a frame, wheel carriers movable longitudinally of the frame, wheels on said carriers, draft devices connected to the wheel carriers and tending constantly to draw the wheels forward, a driver's seat movable relative to the frame under the action of the weight of the driver, and means connecting the driver's seat to the wheel carriers whereby the weight of the driver tends constantly to move the wheels backward, substantially as set forth.

29. In an implement of the character set forth, the combination of a frame, supporting wheels therefor, a beam adapted to be raised and lowered, a driver's seat movable under the weight of the driver relative to the frame, means whereby the movement of the driver's seat elevates the beam and simultaneously varies the balance of the entire structure around the wheel axis, and means accessible to the driver while in his seat for lowering the beam and simultaneously restoring the corresponding balance of the entire structure, substantially as set forth.

30. In an implement of the character set forth, the combination of a frame, supporting wheels therefor, tool beams connected to the frame, means tending constantly to move the tools downward, means tending constantly to move the tools upward, and a stop device for limiting the upward movement of the tools, substantially as set forth.

31. In an implement of the character set forth, the combination of a frame, supporting wheels therefor, tool beams connected to the frame, means tending constantly to move the tools downward, means tending constantly to move the tools upward, and a stop device for limiting the downward movement of the tools, substantially as set forth.

32. In an implement of the character set forth, the combination of a frame, supporting wheels therefor, a tool beam, a hinging or pivoting element for the beam interposed between it and the frame, a driver's seat movable relative to the frame, and power transmitting devices connected to the hinge element independently of the beam for transmitting to the latter the movement of the seat, substantially as set forth.

33. In an implement of the character set forth, the combination of a frame, supporting wheels therefor, a tool beam, a hinge or pivot element to which the tool beam is pivoted on a vertical axis, said hinge element being pivoted to the frame on a horizontal axis, a driver's seat mounted to move relative to the frame, and power transmitting devices connected to the hinge element independently of the beam and its vertical pivot for transmitting to the hinge element movement of the seat, substantially as set forth.

34. In an implement of the character set forth, the combination of a frame, supporting wheels therefor, a laterally swinging tool beam having a vertically adjustable hinged connection at its front end with the frame, a driver's seat movable relative to the frame, and power transmitting devices, comprising the said hinged connection, between the seat and tool beam unaffected by the lateral swinging of the latter, whereby the movement of the driver's seat is caused to lift the tool beam, substantially as set forth.

35. In an implement of the character set forth, the combination of a frame, tool beams connected to the frame, a driver's seat adapted to rise and fall in relation to the frame, two crank axles connected to the frame, a wheel on each of said axles, means interposed between each crank axle and the driver's seat for transmitting movement from one to the other, and means resisting the movements of the crank axles, substantially as set forth.

36. In an implement of the character set forth, the combination of a frame, swinging wheel carriers connected to the frame, wheels on said carriers, tool beams connected to the frame, a driver's seat movable when in use vertically relative to the frame, power transmitting devices between the seat and the wheel carriers for moving the latter rearward, and draft devices connected to the wheel carriers for exerting a forward draft thereon, substantially as set forth.

37. In an implement of the character set forth, the combination of a frame, wheel carriers movable longitudinally of the frame, wheels on said carriers, tool beams connected to the frame, draft devices connected to the movable wheel carriers, a driver's seat adapted to move vertically when in use, and power transmitting devices connecting the seat with the wheel carriers and acting thereon in opposition to the draft devices, substantially as set forth.

38. In an implement of the character set forth, the combination of a frame, supporting wheels therefor, a tool beam acting when at work to draw downward the forward end of the frame, a driver's seat, and means actuated by the weight of the driver when in the seat to elevate the tools and simultaneously move the axis of the wheels rearward, substantially as set forth.

39. In an implement of the character set forth, the combination of the frame, the wheel carriers movable longitudinally of the frame, wheels on the carriers, the tool beams connected to the frame so that their drag tends to pull the front end of the frame downward, connections between the tool beams and the wheel carriers causing the latter to move forward and backward as the tool beams are raised and lowered, a driver's seat normally movable relative to the frame, connections between the driver's seat and the wheel carriers whereby the weight of the driver tends to move the wheel carriers backward, and draft devices connected to the wheel carriers tending to move them forward, substantially as set forth.

In testimony whereof I affix my signature, in presence of two witnesses.

CHARLES H. MELVIN.

Witnesses:
EUGENE L. TAYLOR,
ROY E. ANDERSON.

Copies of this patent may be obtained for five cents each, by addressing the "Commissioner of Patents, Washington, D. C."